US012725016B2

(12) United States Patent
Pesic

(10) Patent No.: US 12,725,016 B2
(45) Date of Patent: Sep. 1, 2026

(54) RECONFIGURABLE FINFET-BASED ARTIFICIAL NEURON AND SYNAPSE DEVICES

(71) Applicant: Applied Materials, Inc., Santa Clara, CA (US)

(72) Inventor: Milan Pesic, Berlin (DE)

(73) Assignee: Applied Materials, Inc., Santa Clara, CA (US)

( * ) Notice: Subject to any disclaimer, the term of this patent is extended or adjusted under 35 U.S.C. 154(b) by 1145 days.

(21) Appl. No.: 16/530,714

(22) Filed: Aug. 2, 2019

(65) Prior Publication Data

US 2021/0034953 A1 Feb. 4, 2021

(51) Int. Cl.
*G06N 3/063* (2023.01)
*G06N 3/065* (2023.01)

(52) U.S. Cl.
CPC ............. *G06N 3/063* (2013.01); *G06N 3/065* (2023.01)

(58) Field of Classification Search
CPC ...... G06N 3/049; G06N 3/063; G06N 3/0635; H01L 27/0886; G11C 11/223; G11C 11/54; H10D 84/834; H10D 84/853
See application file for complete search history.

(56) References Cited

U.S. PATENT DOCUMENTS 8,719,759 B1 * 5/2014 Chou .................... G06F 30/39 716/135
2001/0015450 A1 8/2001 Sugibayashi et al.
2007/0247906 A1 10/2007 Watanabe et al.
2013/0141963 A1 6/2013 Liaw
2014/0122402 A1 * 5/2014 Bichler ................. G06N 3/063 706/27
2014/0199849 A1 7/2014 Mani et al.
2015/0100532 A1 4/2015 Yamaguchi
2015/0286766 A1 * 10/2015 Singh .................... G06F 30/392 716/121
2017/0063351 A1 * 3/2017 Kurokawa ............ G06N 3/065
(Continued)

FOREIGN PATENT DOCUMENTS

JP 2001230326 A 8/2001
JP 2007266209 A 10/2007
(Continued)

OTHER PUBLICATIONS

Yurchuk, Ekaterina, et al. "Charge-trapping phenomena in HfO 2-based FeFET-type nonvolatile memories." IEEE Transactions on Electron Devices 63.9 (2016): 3501-3507. (Year: 2016).*
(Continued)

*Primary Examiner* — Randall K. Baldwin
(74) *Attorney, Agent, or Firm* — Kilpatrick Townsend & Stockton LLP

(57) ABSTRACT

A semiconductor device that implements artificial neurons and synapses together on the semiconductor device includes a plurality of fins formed on the semiconductor device, and a plurality of gates formed around the plurality of fins to form a plurality of fin field-effect transistors (FinFETs). The plurality of FinFETs may form one or more artificial synapses and one or more artificial neurons. Each of the one or more artificial synapses may include two or more of the plurality of gates. Each of the one or more artificial neurons comprises one of the plurality of gates.

20 Claims, 11 Drawing Sheets

(56) References Cited

U.S. PATENT DOCUMENTS

| | | | | |
|---|---|---|---|---|
| 2017/0193363 | A1* | 7/2017 | Lee | G06N 3/049 |
| 2018/0012123 | A1* | 1/2018 | Han | H01L 29/1033 |
| 2018/0211350 | A1 | 7/2018 | Wang et al. | |
| 2019/0012593 | A1* | 1/2019 | Obradovic | G06N 3/063 |
| 2019/0088329 | A1* | 3/2019 | Tiwari | G06N 3/061 |
| 2019/0108433 | A1* | 4/2019 | Hsu | G06N 3/04 |
| 2019/0180174 | A1* | 6/2019 | Koswatta | G06N 3/08 |
| 2019/0251430 | A1* | 8/2019 | Gokmen | G06N 3/084 |
| 2019/0312108 | A1* | 10/2019 | Li | H01L 29/802 |
| 2020/0042665 | A1* | 2/2020 | Lin | G06F 30/34 |
| 2020/0065647 | A1* | 2/2020 | Mulaosmanovic | G06N 3/049 |
| 2020/0364548 | A1* | 11/2020 | Chang | G06N 3/04 |
| 2023/0268396 | A1* | 8/2023 | Li | H01L 29/42392 257/192 |

FOREIGN PATENT DOCUMENTS

| | | | |
|---|---|---|---|
| JP | 2015072610 | A | 4/2015 |
| KR | 10-2013-0138052 | A | 12/2013 |
| KR | 2019-0005101 | A | 1/2019 |
| WO | 2018-138603 | A1 | 8/2018 |
| WO | WO-2019066959 | A1 * | 4/2019 |

OTHER PUBLICATIONS

Hoffmann, Michael, et al. "Direct observation of negative capacitance in polycrystalline ferroelectric HfO2." Advanced Functional Materials 26.47 (2016): 8643-8649. (Year: 2016).*

Pesic, Milan, et al. "Deconvoluting charge trapping and nucleation interplay in FeFETs: Kinetics and Reliability." 2018 IEEE International Electron Devices Meeting (IEDM). IEEE, 2018: 25.1.1-25.1.4 (Year: 2018).*

Du, Yuan, et al. "An analog neural network computing engine using CMOS-compatible charge-trap-transistor (CTT)." IEEE Transactions on Computer-Aided Design of Integrated Circuits and Systems 38.10 (2018): 1811-1819. (Year: 2018).*

Chen, Gregory K., et al. "A 4096-neuron 1M-synapse 3.8-pJ/SOP spiking neural network with on-chip STDP learning and sparse weights in 10-nm FinFET CMOS." IEEE Journal of Solid-State Circuits 54.4 (2018): 992-1002. (Year: 2018).*

Pešić, M., et al. "Physical and circuit modeling of HfO 2 based ferroelectric memories and devices." 2017 IEEE SOI-3D-Subthreshold Microelectronics Technology Unified Conference (S3S). IEEE, 2017. (Year: 2017).*

Auth, Chris, et al. "A 10nm high performance and low-power CMOS technology featuring 3 rd generation FinFET transistors, Self-Aligned Quad Patterning, contact over active gate and cobalt local interconnects." 2017 IEEE International Electron Devices Meeting (IEDM). IEEE, 2017: 29.1.1-29.1.4 (Year: 2017).*

Jerry, Matthew, et al. "Ferroelectric FET analog synapse for acceleration of deep neural network training." 2017 IEEE international electron devices meeting (IEDM). IEEE, 2017: 6.2.1-6.2.4 (Year: 2017).*

Wang, Zheng, et al. "Experimental Demonstration of Ferroelectric Spiking Neurons for Unsupervised Clustering." 2018 IEEE International Electron Devices Meeting (IEDM). 2018. (Year: 2018).*

Chen, C., et al. "Bio-inspired neurons based on novel leaky-FeFET with ultra-low hardware cost and advanced functionality for all-ferroelectric neural network." 2019 Symposium on VLSI Technology. IEEE, Jun. 2019: T136-T137 (Year: 2019).*

Seo, Myungsoo, et al. "First demonstration of a logic-process compatible junctionless ferroelectric FinFET synapse for neuromorphic applications." IEEE Electron Device Letters 39.9 (2018): 1445-1448. (Year: 2018).*

Kim, Hyungjin, et al. "Silicon-based floating-body synaptic transistor with frequency-dependent short-and long-term memories." IEEE Electron Device Letters 37.3 (2016): 249-252. (Year: 2016).*

International Preliminary Report on Patentability mailed on Feb. 17, 2022 in International Patent Application No. PCT/US2020/043796, 5 pages.

International Search Report and Written Opinion mailed Nov. 9, 2020 in International Patent Application No. PCT/US2020/043796, 9 pages.

Chatterjee, et al. "A CMOS Compatible Bulk FinFET-Based Ultra Low Energy Leaky Integrate and Fire Neuron for Spiking Neural Networks", IEEE Electron Device Letters. vol. 40, No. 8, Aug. 2019, pp. 1-4. DOI. 10.1109/LED.2019.2924259.

"Intel Announces Production-Ready 22nm 3-D Tri-Gate Transistor" [Web page], May 5, 2011, Retrieved on Aug. 6, 2023 from Coventor website: https://www.coventor.com/blog/intel-announces-production-ready-22nm-3-d-tri-gate-transistor/, 2 pages.

Kentastophe (https://electronics.stackexchange.com/users/166306/kentastophe), "Multiple Transistors (FinFET) sharing a gate?," Retrieved on Aug. 6, 2023 from https://electronics.stackexchange.com/q/335397, 4 pages.

Extended European Search Report mailed Jul. 21, 2023 in European Application No. 20850352.4, 13 pages.

* cited by examiner

RECONFIGURABLE FINFET-BASED ARTIFICIAL NEURON AND SYNAPSE DEVICES

BACKGROUND

A modern electronic neural network includes digital and/or analog circuitry that is inspired by, and seeks to approximate, the biological neural networks used by neurological systems found in nature. Like their natural counterparts, electronic neural networks attempt to learn and perform various tasks and recognize input stimuli without being pre-programmed using tasks-specific rules. This learning process may be accomplished using a collection of connected nodes representing artificial neurons which operationally approximate the behavior of neurons in a biological system. Connections between neurons may approximate the behavior of biological synapses to transmit signals between one or more artificial neurons. Multiple successive layers of neuron-and-synapse connections can be chained together to break complex tasks down into incremental stages. Therefore, an electronic neural network can be taught to perform new tasks in the same way that biological neural networks learn and grow over time.

SUMMARY

In some embodiments, a semiconductor device that implements artificial neurons and synapses together on the semiconductor device may include a plurality of fins formed on the semiconductor device, and a plurality of gates formed around the plurality of fins to form a plurality of fin field-effect transistors (FinFETs). The plurality of FinFETs may form one or more artificial synapses and one or more artificial neurons. Each of the one or more artificial synapses may include two or more of the plurality of gates. Each of the one or more artificial neurons comprises one of the plurality of gates.

In some embodiments, a method of implementing artificial neurons and synapses together on a semiconductor device may include forming a plurality of fins on the semiconductor device. The method may also include forming a plurality of gates around the plurality of fins to form a plurality of fin field-effect transistors (FinFETs). The plurality of FinFETs may form one or more artificial synapses and one or more artificial neurons. Each of the one or more artificial synapses may include two or more of the plurality of gates, and each of the one or more artificial neurons may include one of the plurality of gates.

In any embodiments, any and/or all of the following features may be incorporated in any combination and without limitation. The device may also include one or more connections between the plurality of gates, where the one or more connections may form a network of one or more artificial synapses and one or more artificial neurons. The one or more connections between the plurality of gates may be implemented directly after gate deposition. The one or more connections between the plurality of gates may be implemented in a metal layer of the semiconductor device. The plurality of fins may include a first fin, the plurality of gates may include a first plurality of gates, and the first plurality of gates may be formed over the first fin to form a single one of the plurality of artificial synapses. The plurality of fins may include a first plurality of fins, the plurality of gates may include a first gate; and the first gate may be formed over the first plurality of fins to form at least a portion of one of the plurality of artificial synapses. The semiconductor device may include a silicon substrate, and each of the plurality of fins may be formed as a vertical ridge in the silicon substrate. The plurality of finFETs may include a plurality of ferroelectric finFETs. The plurality of fins may be formed in a uniform pattern on the semiconductor device, such that each of the plurality of fins can be used for an artificial neuron or an artificial synapse. Each of the plurality of fins may be formed to have a uniform width. The one or more connections may be made in a system level after fabricating the semiconductor device. The one or more connections may be made in a software level after fabricating the semiconductor device. Each of the one or more artificial neurons may be configured to receive a plurality of signal pulses before switching between conductivity states. Each of the one or more artificial synapses may be configured to receive a plurality of signal pulses, each of which cause respective domains to switch between conductivity states. Each of the plurality of fins may be approximately 10 nm wide. The plurality of fins and the plurality of gates may be formed in a plurality of discrete fields as neurons, and ones of the plurality of discrete fields may be connected to form synapses. The plurality of fins and the plurality of gates may be formed in a same technology node. One or more complimentary metal-oxide silicon (CMOS) circuits may be formed on the semiconductor device.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Described herein are embodiments for implementing artificial neurons and artificial synapses together on a single technology node in a semiconductor device. Rows of ferroelectric FinFETs can be fabricated on a silicon substrate. Gates can be connected together to form multi-domain FinFETs that approximate synaptic behavior by gradually transitioning the conductivity of the FinFET channel in response to received signal pulses. Single gates can be used to approximate neuron behavior by receiving a plurality of signal pulses before switching their single conductivity state. Because the same structure can be used as a basis for both artificial neurons and artificial synapses, neural networks can be formed on a single technology node and can be configured at a time of manufacture at a gate deposition layer or a metal deposition layer. Alternatively, the neural network can be configured and/or reconfigured after manufacturing at a system-level layer using configurable connections.

Figure 1:
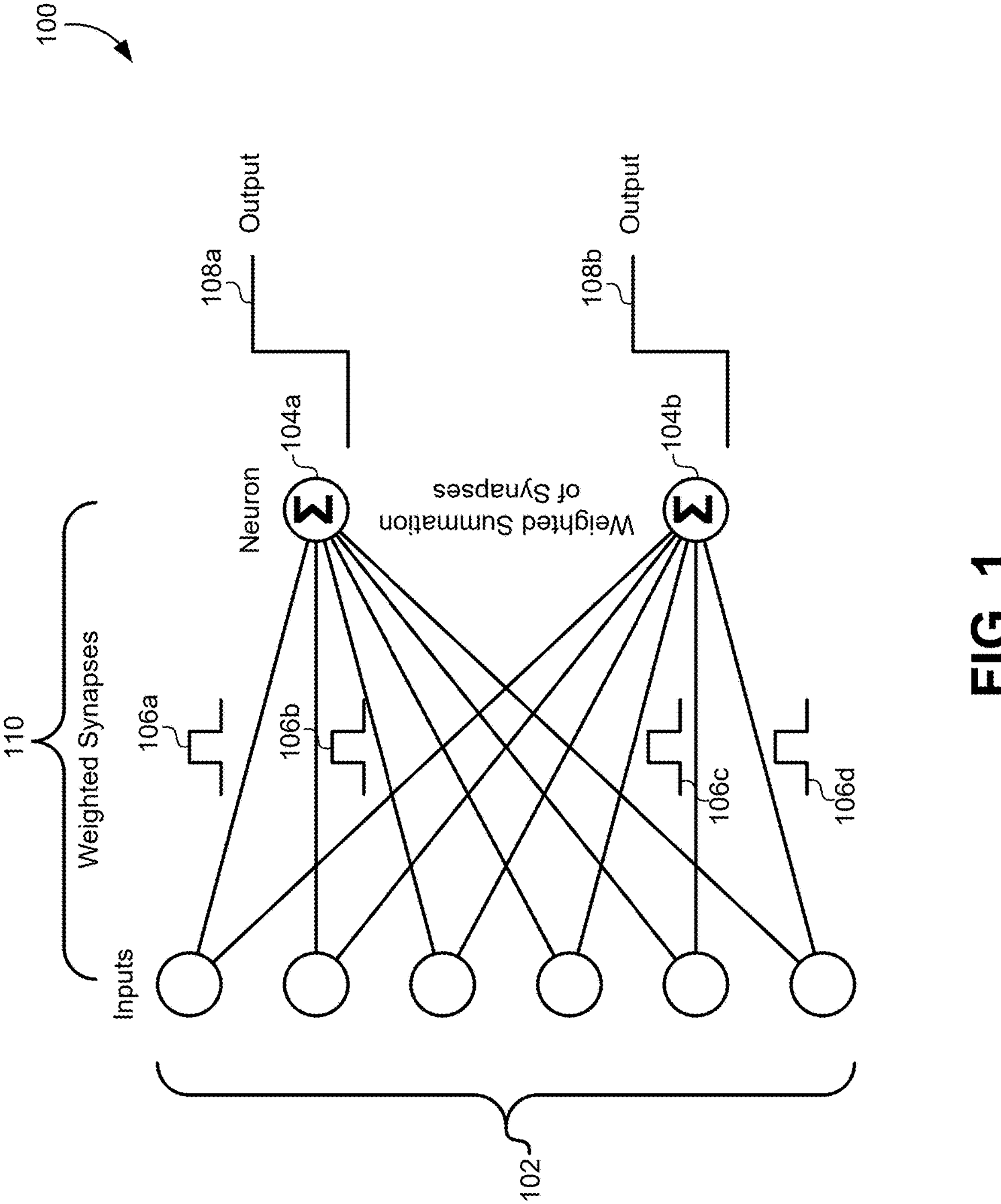
FIG. 1 illustrates a diagram of a portion of a neural network, according to some embodiments.

FIG. 1 illustrates a diagram of a portion of a neural network 100, according to some embodiments. The neural network 100 includes a plurality of inputs 102. The inputs may correspond to an input in a biological system, such as an axon representing a nerve fiber or a long slender projection of a neuron that conducts electrical impulses and acts as a transmission line in the nervous system. For example, the plurality of inputs 102 may represent axons tied to respective photoreceptors used to encode received light in the surrounding environment and transmit an electrical signal representing the received light. The electrical signal may be scaled to represent a magnitude or intensity of a received signal. For example, the plurality of inputs 102 may generate electrical signals that are proportional to an intensity of a received light signal. It should be noted that the use of photoreceptors and image recognition is provided merely by way of example and is not meant to be limiting. Other types of biological and electrical neural networks may be used to receive and process any type of input.

After receiving an input signal at the plurality of inputs 102, each of the plurality of inputs 102 may transmit pulses 106 (e.g., pulses 106*a*, 106*b*, 106*c*, 106*d*) to one or more neurons 104 (e.g., neurons 104*a*, 104*b*). The neural network 100 illustrates these pathways between the inputs 102 and the neurons 104 as a plurality of synapses 110. In a biological nervous system, a synapse is a structure that permits a neuron or nerve cell to pass an electrical or chemical signal to another neuron. In the neural network 100, biological synapses may be modeled using synapses 110 that pass a weighted signal between the inputs 102 and the neurons 104 that represents the magnitude of the signal received by the inputs 102. The synapses 110 may also be weighted. For example, a single one of the plurality of inputs 102 may receive an input signal that is weighted differently by the synapses as it is sent to different neurons 104. The weighting of synapses 110 is what allows a neural network to "learn" to recognize specific input patterns and perform specific output tasks. When modeling the synapses 110 in a neural network, they may be represented by a semiconductor device that can receive a plurality of sequential input pulses and generate a corresponding output. For example, each input pulse may cause the synapse output to gradually increase between a logic 0 and a logic 1 level.

The synapses 110 may connect the inputs 102 to one or more neurons 104. These connections may be made in a one-to-many topology between the inputs 102 and the neurons 104. The neurons 104 in the neural network may be modeled after biological neurons, which are electrically excitable cells that communicate with other cells between connecting synapses. After receiving a sufficient number of input impulses, a neuron 104 may "fire" or transition into an excited state. The state may be associated with a sensory response (e.g., touch, sound, light, etc.) and/or motor controls from the brain. To approximate the behavior of a biological neuron, the neurons 102 in the neural network 100 may be implemented using any device that can receive a plurality of input pulses from one or more synapses 110, and after receiving a threshold number of input pulses, cause the outputs 108 (e.g., outputs 108*a*, 108*b*) of the neurons 104 to toggle between logic 0 and logic 1 states.

FIG. 1 illustrates a greatly simplified view of the neural network 100 in order to describe the various network components clearly. In practice, the neural network 100 may also include one or more hidden layer neurons and synapses between the inputs 102 and the outputs 108. These hidden or intermediate layers allow the task of generating the final outputs 108 to be broken down into sub-steps, each of which may be represented by a corresponding hidden layer of synapses and neurons. For example, the neural network 100 may be configured to distinguish between two different types of images, causing output 108*a* to fire when recognizing a first type of image, and causing output 108*b* to fire when recognizing a second type of image. A first hidden layer of neurons and synapses may recognize edges within the images. A second hidden layer of neurons and synapses may recognize shapes forwarded by the edges within the images. Finally, the neurons 104 in the output stage may combine the recognized shapes to distinguish between the first and second image types. Therefore, the neural network 100 may be far more complex in terms of electrical components and connections than may be readily apparent in FIG. 1. Because of the size, complexity, speed requirements, and/or routing difficulties that may accompany complex modern neural networks, there is a great need for circuit elements that can represent biological neurons and synapses in a way that can still allow for efficient layout and fabrication of many devices on a single technology node.

Figure 2:
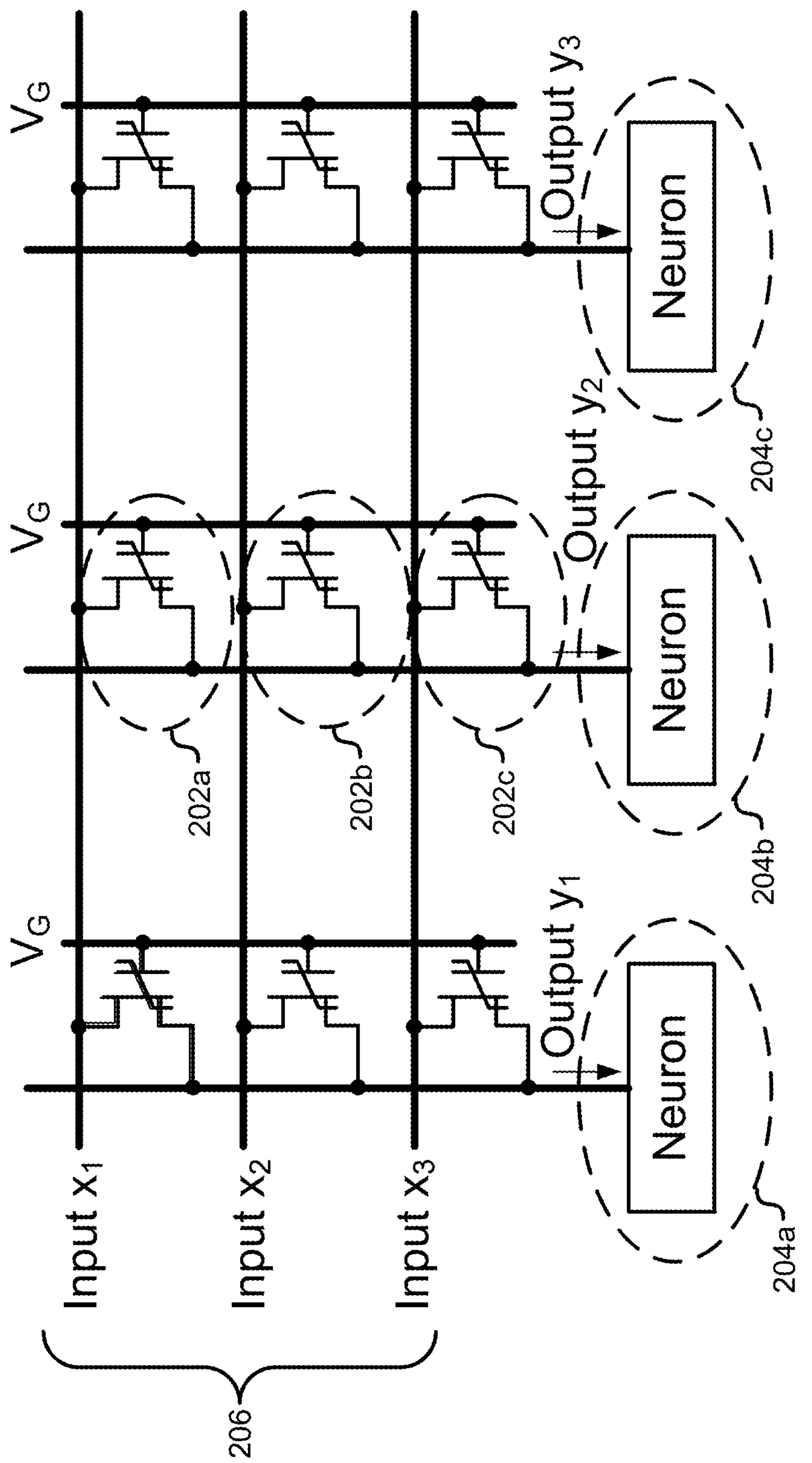
FIG. 2 illustrates a circuit network that implements a neural network, according to some embodiments.

FIG. 2 illustrates a circuit network 200 that implements a neural network, according to some embodiments. The neural network represented by the circuit network 200 may be similar to the neural network 100 in FIG. 1. As was the case for FIG. 1, FIG. 2 is a greatly simplified view of a simple neural network where many connections and/or hidden layers have been omitted for the sake of clearly describing the various circuit components that can be used to represent neurons and synapses. The circuit network 200 includes a plurality of inputs 206 that may correspond to the inputs 102 of FIG. 1. The inputs may be connected to a plurality of devices representing neurons 204 through devices representing synapses. The devices representing the synapses may include transistors 202 (e.g., transistors 202*a*, 202*b*, 202*c*) that connect the inputs of the neurons 204 (e.g., neurons 204*a*, 204*b*, 204*c*) to the circuit inputs 206. For the sake of simplicity, many additional circuit elements, such as access transistors have been omitted from FIG. 2. Access transistors may prevent disturbances with a gate connected to the inputs, while the output is connected to the gate of the FeFET. This access transistor together with memory transistor/element constitutes one synaptic element of the pseudo-crossbar array of synapses.

Many different devices may be used to represent synapses in a circuit network. In this circuit network, the transistors 202 may be implemented using semiconductor devices that can receive a plurality of input pulses on the VG line and provide a proportional output to the neurons 204 that are also FeFET transistors (ultimately scaled). Thus, these transistor 202 may be used to model an analog synapse that is controlled by the VG line. Additionally, the neurons 204 may also be represented by ultimately scaled transistor devices. However, in contrast to the transistors 202 representing the synapses which exhibit an analog, gradual accumulative change of the conductance upon receiving excitation pulses, the transistors representing neurons 204 may be configured to receive a plurality of pulses from the synapses and fire after threshold number of pulses have been received. This basic network of transistor connections between the inputs and the output neurons 204 may be augmented using hidden layers of transistors representing hidden layers of neurons and synapses as described above. When implementing the circuit network 202, it therefore would be beneficial to use semiconductor devices that can implement both the analog behavior of the synapses and the digital behavior of the neurons in a single process.

In various embodiments, many different types of transistors may be used to implement the basic components of a neural network. However, some embodiments described herein may use a specific type of transistor known as a ferroelectric field-effect transistor (FeFET). A FeFET is a logic/memory transistor that can maintain its logical/memory state even when power is removed. FeFETs are similar to traditional metal oxide silicate (MOS) transistors, except that the logic gate dielectric is replaced with a ferroelectric material, which is a dielectric that "remembers" or stores electric fields to which it has been exposed. In a FeFET, a persistent dipole (or so-called "domain") may be formed within the gate dielectric itself, thereby splitting the threshold voltage of the FeFET into two stable states that can represent binary logic states. Because these stable states are persistent, the operation of a FeFET can store state information as is done in a traditional charge-based Flash memory cell. FeFETs also use a relatively small amount of power and are inherently scalable alongside traditional CMOS technologies. The read/write time and the write/erase amplitude for FeFET cells when used as memory devices is also significantly faster and lower, respectively than memories such as Flash NAND memory.

Figure 3:
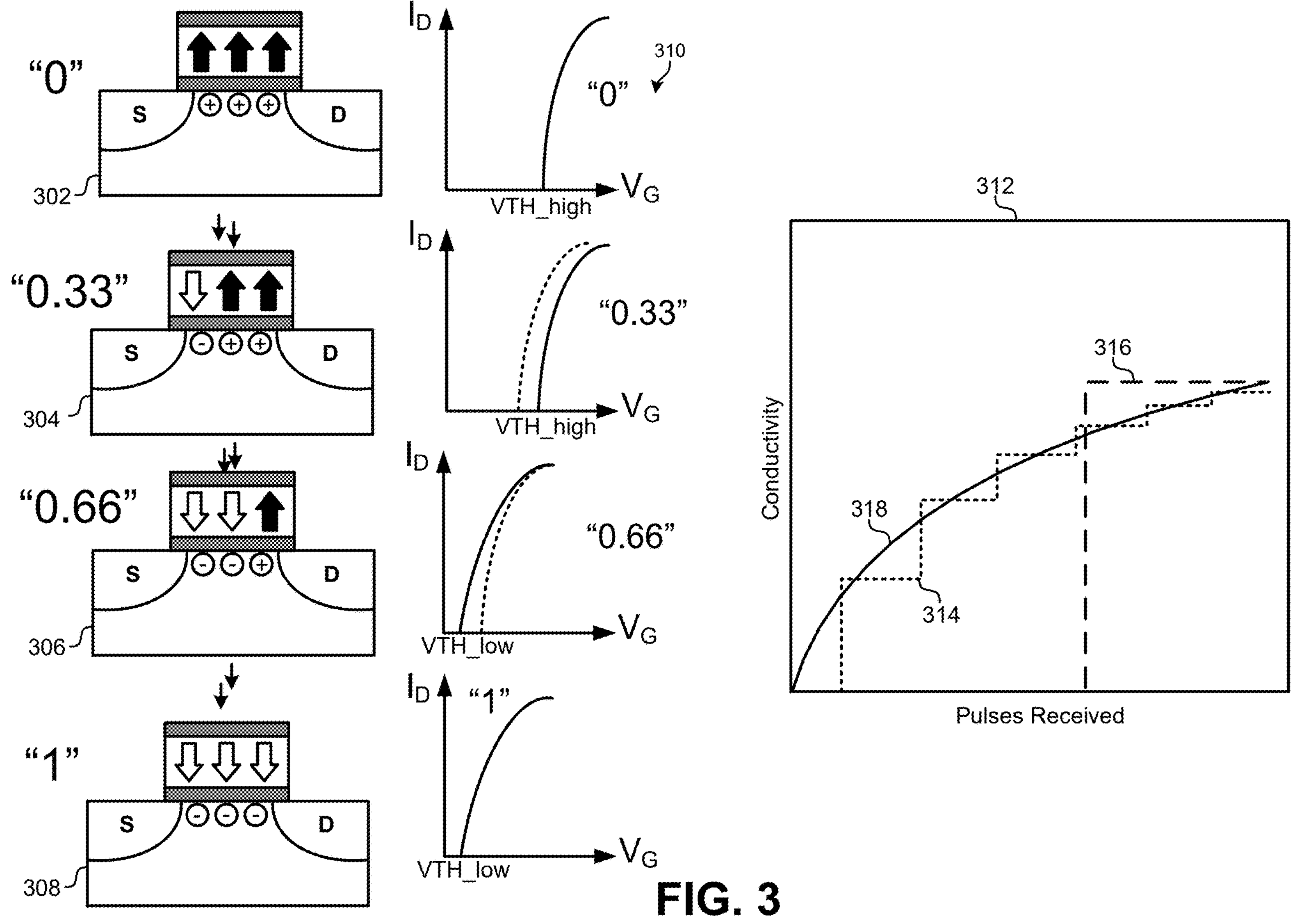
FIG. 3 illustrates a switching cycle for ferroelectric field-effect transistors FeFETs depending on the transistor area, according to some embodiments.

FIG. 3 illustrates a switching cycle for FeFETs, according to some embodiments. Ferroelectric materials are materials that can change their state upon application of an external excitation, such as an applied voltage. Ferroelectric materials may include a plurality of physical domains that can be toggled between two stable states. Ferroelectrics may be integrated into a gate of the FeFETs to be used as memory devices. FIG. 3 illustrates one of the features of a FeFET that makes it particularly useful for modeling neurons and synapses in a neural network. Each of the FeFET states 302, 304, 306, 308 on the left-hand side of FIG. 3 represent various states for a FeFET as it gradually transitions between a logic 0 and a logic 1 state. Because of this gradual transition, the FeFET in FIG. 3 may be used to model a synapse. Recall that synaptic behavior gradually transitions between logic states in response to repeated input pulses on the gate electrode. Instead of switching the conductivity of the device in response to a single event, the FeFET may instead gradually switch the conductivity over time as pulses are received from inputs or other neurons-like devices in the neural network.

To model synaptic behavior, a FeFET may be designed to be comparatively larger than similar neuron devices such that the gate electrode can be represented as a plurality of domains, or physical regions that can independently switch in the gate electrode between logic states. Each of these domains is represented in FIG. 3 using the vertical arrows on the gate electrodes of the FeFET in various states 302, 304, 306, 308. The direction of these vertical arrows changes direction to represent the switching behavior of a corresponding domain in the gate. Changing one of the domains in the FeFET may correspond to a change in the structure of the ferroelectric crystal lattice material in the FeFET. Because the crystal lattice itself changes its configuration, the state of the FeFET can persist between input pulses that cause the domains to switch. Furthermore, each domain may be represented with its own hysteresis diagram 310 that switches between stable states. Thus, when a single pulse is received at the gate of the FeFET, one of the domains may switch between stable states, such as transitioning from a logic 0 to a logic 1.

Beginning with the FeFET state 302 at the top of FIG. 3, the FeFET may begin in a logic 0. In this example, the FeFET may be designed to include three distinct domains, although in practice devices may include fewer or many more domains than three. Each of the three vertical arrows pointing up indicates that each of the three domains is currently in the stable logic 0 state. After receiving a first input pulse of opposing polarity compared to one required to reside in logical 0 state, the FeFET may be enter state 304. In state 304, the first domain of the FeFET has switched from a logic 0 to a logic 1. This also is indicated in the hysteresis diagram 310. The received input pulse was sufficient to change a single domain, while leaving the other domains at the stable logic 0 state. Note that some transitions may require multiple pulses to switch a single domain. Next, a second input pulse may be received by the FeFET, causing a second domain of the FeFET to transition to the logic 1 state. This is represented by the second arrow in the gate of the FeFET changing to point downwards in the illustration of state 306. Finally, a third input pulse may be received by the FeFET, causing the final domain to transition to the logic 1 state.

This gradual transition of domains within the FeFET with a plurality of domains may provide the analog-like transition between states that is useful in modeling synaptic behavior. Before receiving any input pulses, state 302 represents a full logic 0 state for the FeFET. Conversely, after receiving a sufficient number of input pulses (e.g., at least three pulses), state 308 represents a full logic 1 state for the FeFET. As each of the domains switch independently, the conductivity of the channel in the FeFET may gradually change between a nonconductive state and a fully conductive state in a corresponding manner. This change in conductivity may cause the output of the synapse to also gradually increase/decrease as positive/negative input pulses are received to switch the corresponding domains.

Graph 312 in FIG. 3 represents the switching behavior of FeFETs with varying numbers of domains. Signal 314 represents a multi-domain FeFET that receives pulses gradually over time. The number of pulses received is represented by the horizontal axis, and the resulting conductivity of the channel of the FeFET is represented by the vertical axis. For the multi-domain FeFET, each received pulse or set of pulses results in a step increase in the conductivity of the channel as independent domains switch. The FeFET represented by signal 314 may include at least six domains. Curve 318 represents an ideal response that can be approximated by increasing the number of domains in the FeFET. For example, as the number of domains in the FeFET increases, the steps of signal 314 may become smaller, and the overall shape of signal 314 may begin to approach the shape of curve 318. Graph 312 thus illustrates how a multi-domain FeFET can be used to model the analog output of a synapse that is proportionately responsive to received input pulses.

In contrast to the synaptic behavior illustrated by the multi-domain FeFET in FIG. 3, a simpler, smaller FeFET device may also be used to represent neuron behavior in a neural network. Although not shown explicitly in FIG. 3, a FeFET having only a single domain would have only a single switching event. Signal 316 of graph 312 shows how a single-domain FeFET may respond to a plurality received pulses. Instead of switching individual domains as pulses are received, the neuron-like FeFET having only a single domain may exhibit a single switching event between stable logic states. For example, when a sufficient number of pulses have been received from larger FeFETs representing synapses, a smaller FeFET representing a neuron can "fire," or transition between stable states. Therefore, not only is the FeFET useful for representing synaptic behavior, it can also be used to represent neuron behavior by limiting the number of domains in the device.

Figure 4:
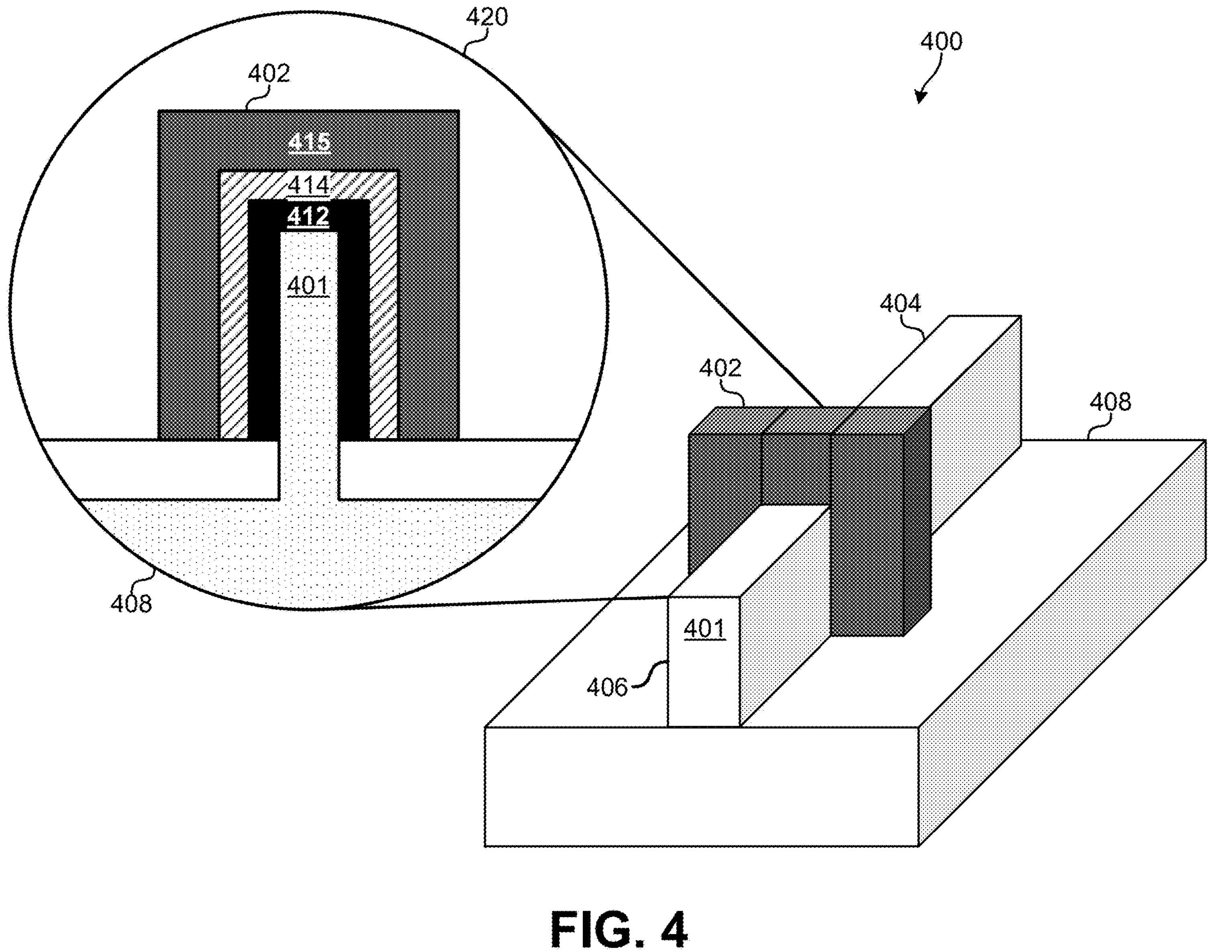
FIG. 4 illustrates a ferroelectric fin field-effect transistor (FinFET) that may be used to implement artificial neurons and synapses, according to some embodiments.

FIG. 4 illustrates a ferroelectric fin field-effect transistor (FinFET) 400 that may be used to implement artificial neurons and synapses, according to some embodiments. The FinFET 400 is a multi-gate device comprising a MOSFET built onto a substrate 408. Instead of implementing the source and the drain of the transistor as doped wells in the substrate 408, a fin 401 is fabricated on top of the substrate 408 to form the channel, the source 406, and the drain 404 of the transistor. A gate 402 can be wrapped around the channel formed by the fin 401 to provide greater control of the channel when turning the transistor on/off. FinFET devices have significantly faster switching times and higher current densities than mainstream CMOS technology.

Throughout the remainder of this disclosure, various FinFET devices may be represented using the simplified view in the lower left of FIG. 4. However, a detailed view 420 in the upper right of FIG. 4 illustrates one embodiment of the various layers that may be deposited around the channel of the FinFET 400. For these embodiments, a ferroelectric material may be added (or exchanged with the existing high-k material) to the gate of the FinFET 400 in order to function as a neuron or synapse as described above. For example, the channel may include an un-doped silicon fin 401 surrounded by a gate oxide 412 and a ferroelectric material 414. This ferroelectric structure may then be fabricated with a conductive gate material 415 to generate the electric field necessary for polarizing the ferroelectric material 414.

The ferroelectric FinFET 400 may be fabricated using method similar for fabricating standard logic FinFETs using a self-aligned double patterning technique where a spacer is formed by deposition or reaction of a film layer deposited on the substrate. An etching process can then remove all the fill material on the horizontal surfaces, leaving only material on the sidewalls. After removing the pattern feature, only the spacer is left. This spacer technique can be used to define narrow fins in rows on the substrate. However, unlike the standard FinFET fabrication processes, the ferroelectric FinFET 400 may also include a ferroelectric high-K deposition step and post-capping anneal to stabilize the ferroelectric phase. Some embodiments may use a solid solution intermixed with silicon, aluminum, lanthanum, zirconium, and/or HfO-ZrOx compositions of different ratios. Some embodiments may also use an additional anneal process to stabilize the ferroelectric phase within the high-K. When fabricating ferroelectric FinFETs to implement an artificial synapse, a connection between multiple gates may be used as described below in a "Back End of Line" (BEoL) portion of the fabrication process.

For the embodiments described herein, the ferroelectric FinFET 400 may be particularly well-suited for implementing artificial neurons and synapses. When compared to a planar device, the domains described above in the fin 401 can be implemented in the ferroelectric material 414 to provide a significant improvement when implementing a large number of devices at scale. Additionally, the shape of the gate 402 can generate more domains while also decreasing the size of these domains. This may result in improved variability of the ferroelectric FinFET device compared to other devices. It is also relatively easy to add additional gates to a device to model a synapse, which provides an improved ability to tune the device, and can allow a designer to choose between implementing a neuron with a single gate as well as a synapse with multiple gates on the same silicon structure.

The ferroelectric FinFET 400 illustrated in FIG. 4 may be used to implement an artificial neuron. The single gate 402 may be designed to include a single domain that switches after a number of pulses have been received by the gate 402. For example, the ferroelectric FinFET 400 may be used to implement one of the artificial neurons 204 in FIG. 2.

Figure 5:
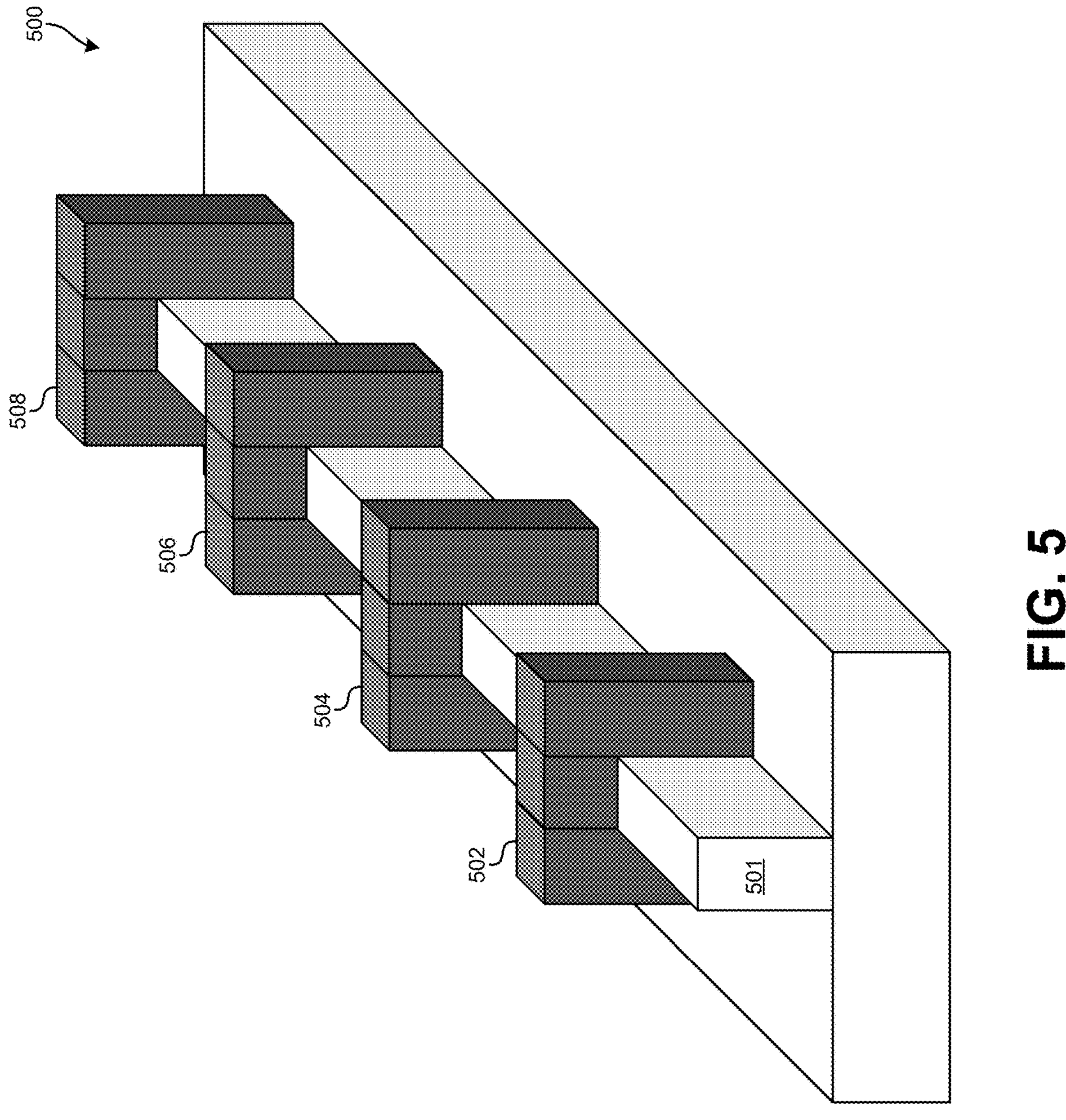
FIG. 5 illustrates a view of a ferroelectric FinFET structure with multiple gate structures, according to some embodiments.

FIG. 5 illustrates a view of a ferroelectric FinFET structure 500 with multiple gate structures, according to some embodiments. This ferroelectric FinFET structure 500 may include a raised fin 501 as illustrated in FIG. 4. However, the single fin 501 may have multiple gates 502, 504, 506, 508 deposited on the fin 501. To implement an artificial neuron, a single gate (e.g., gate 502) from the multiple gates 502, 504, 506, 508 may be selected and connected to an input from an artificial synapse. The source and drain regions on either side of the single gate may then be connected to the output of the neuron.

Figure 6:
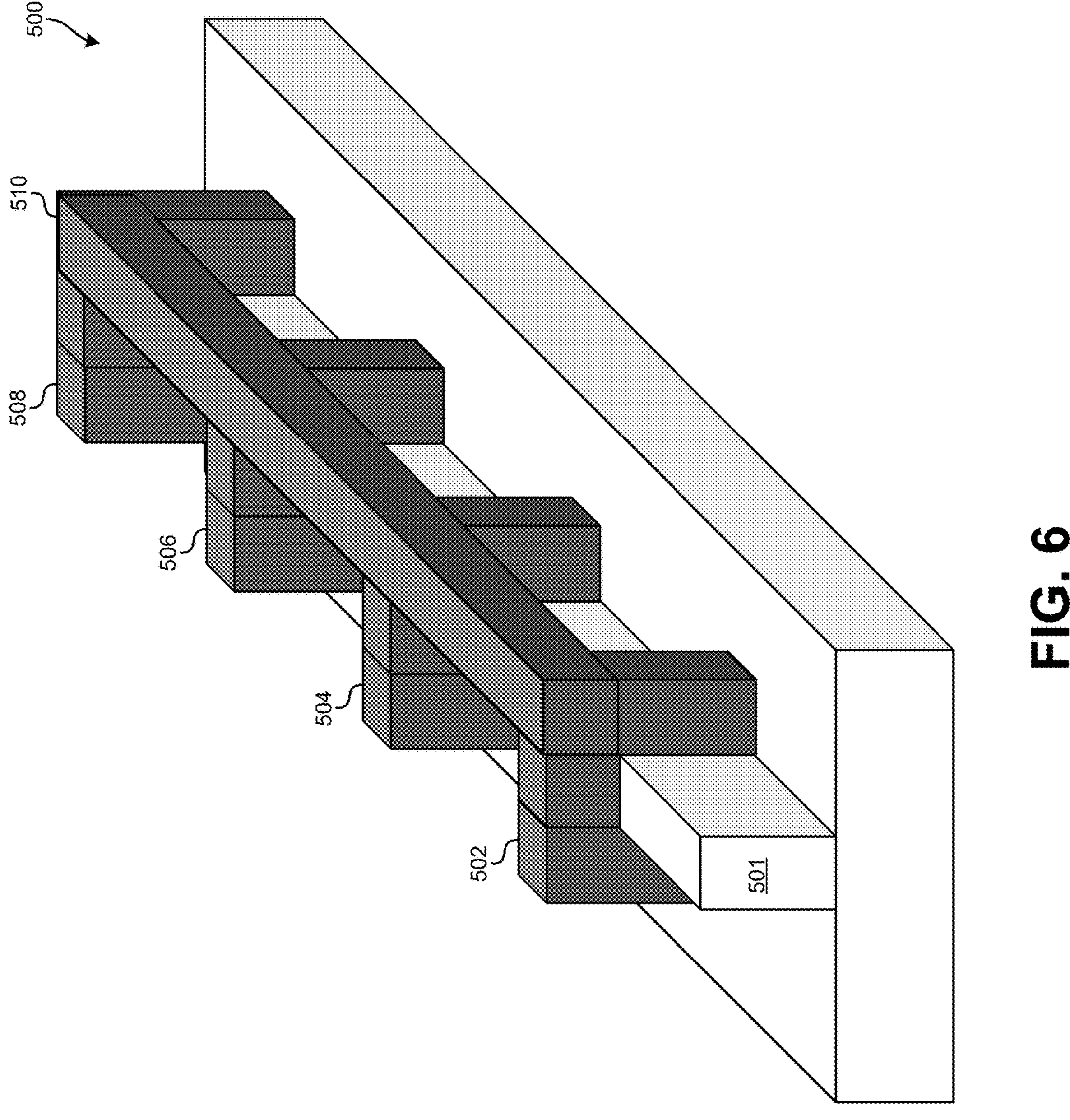
FIG. 6 illustrates a view of the same ferroelectric FinFET structure with multiple gate structures to implement an artificial synapse, according to some embodiments.

FIG. 6 illustrates a view of the same ferroelectric FinFET structure 500 with multiple gate structures to implement an artificial synapse, according to some embodiments. Instead of only using a single gate 502 on the ferroelectric FinFET structure 500, a plurality of the gates 502, 504, 506, 508 may be electrically connected together using an electrical connection 510. The electrical connection 510 illustrated in FIG. 6 may be formed in the same deposition layer as the gates 502, 504, 506, 508. As will be described below, this electrical connection 510 may also be made in a metal layer above the deposition layer for the gates 502, 504, 506, 508. This electrical connection 510 may also be made using a configurable network of connections or through system-level configurable processes.

By connecting the plurality of gates 502, 504, 506, 508 together using the electrical connection 510, a ferroelectric FinFET can be formed that includes multiple domains as described above for simulating synaptic behavior. Specifically, the plurality of gates may form a plurality of domains, each of which can switch independently in response to received input pulses from upstream artificial neurons.

The ferroelectric FinFETs illustrated in FIG. 5 and FIG. 6 may use the same fin structure to implement both neurons and synapses. Therefore, a single fin 501 may have multiple gates 502, 504, 506, 508, and the connections between those gates 502, 504, 506, 508 can define whether the fin 501 is part of an artificial neuron or an artificial synapse.

Figure 7:
FIG. 7 illustrates a ferroelectric FinFET structure with multiple fins, according to some embodiments.
Figure 7:
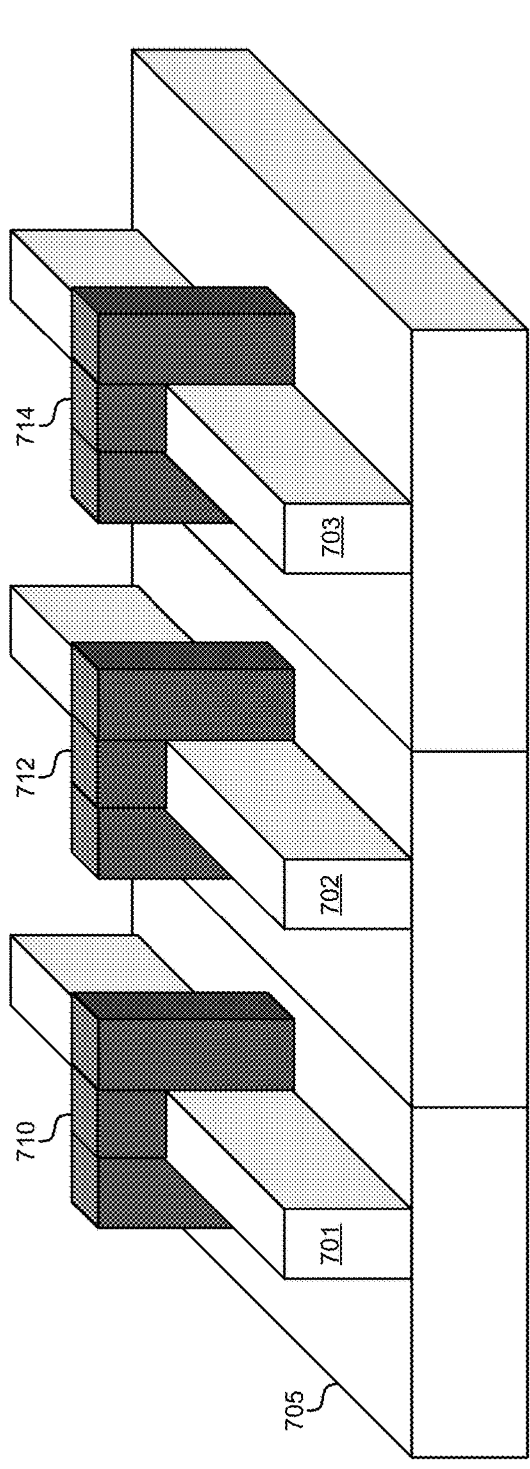

FIG. 7 illustrates a ferroelectric FinFET structure 700 with multiple fins, according to some embodiments. A plurality of fins 701, 702, 703 may be formed on a semiconductor device or substrate 705. A plurality of gates 710, 712, 714 may be formed around the plurality of fins 701, 702, 703 to form a plurality of potential FinFETs based on varying connections that may be made between the plurality of gates 710, 712, 714. In this example, a gate 710 on a fin 701 that is not connected to a plurality of other gates (e.g., gates 712, 714) may be used to implement an artificial neuron. Therefore, in this example, the three fins 701, 702, 703 and the three gates 710, 712, 714 may form three individual artificial neurons.

Figure 8:
FIG. 8 illustrates a ferroelectric FinFET structure with multiple fins and multiple gates, according to some embodiments.
Figure 8:
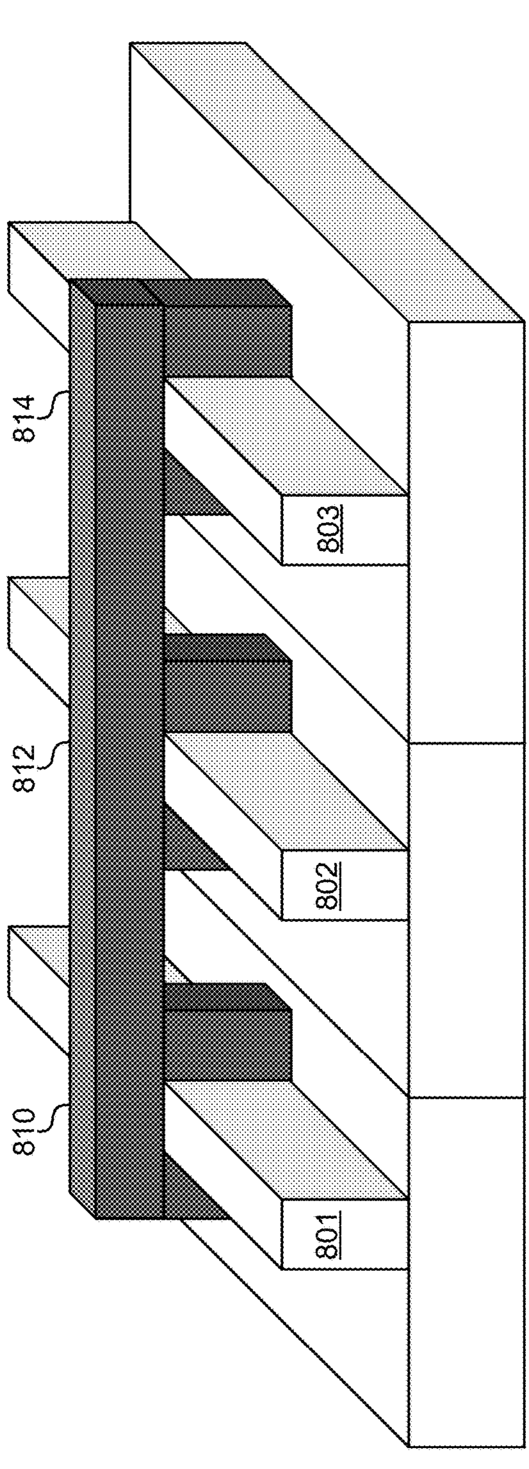

FIG. 8 illustrates a ferroelectric FinFET structure 800 with multiple fins and multiple gates, according to some embodiments. This ferroelectric FinFET structure 800 is similar to the structure 700 of FIG. 7, except that each of a plurality of gates 810, 812, 814 may be electrically connected together to form an artificial synapse. Recall that the artificial synapse formed in FIG. 6 used a single fin 501 with multiple gates 502, 504, 506, 508 attached to the single fin 501 to form multiple domains for the artificial synapse. In contrast, the artificial synapse formed in FIG. 8 uses multiple gates 810, 812, 814 that are each coupled to multiple fins 801, 802, 803. FIG. 6 uses a multi-gate FinFET to implement a synapse, while FIG. 8 uses a multi-channel FinFET to implement a synapse. Again, these connections may be made directly by gate deposition, using BEoL processes in a metal layer, or using a configurable system level process. The multi-channel configuration of FIG. 8 may be advantageous as it is efficient and would not result in scalable signal of the neuron compared to the multi-gate, single-fin configuration of FIG. 6.

Figure 9:
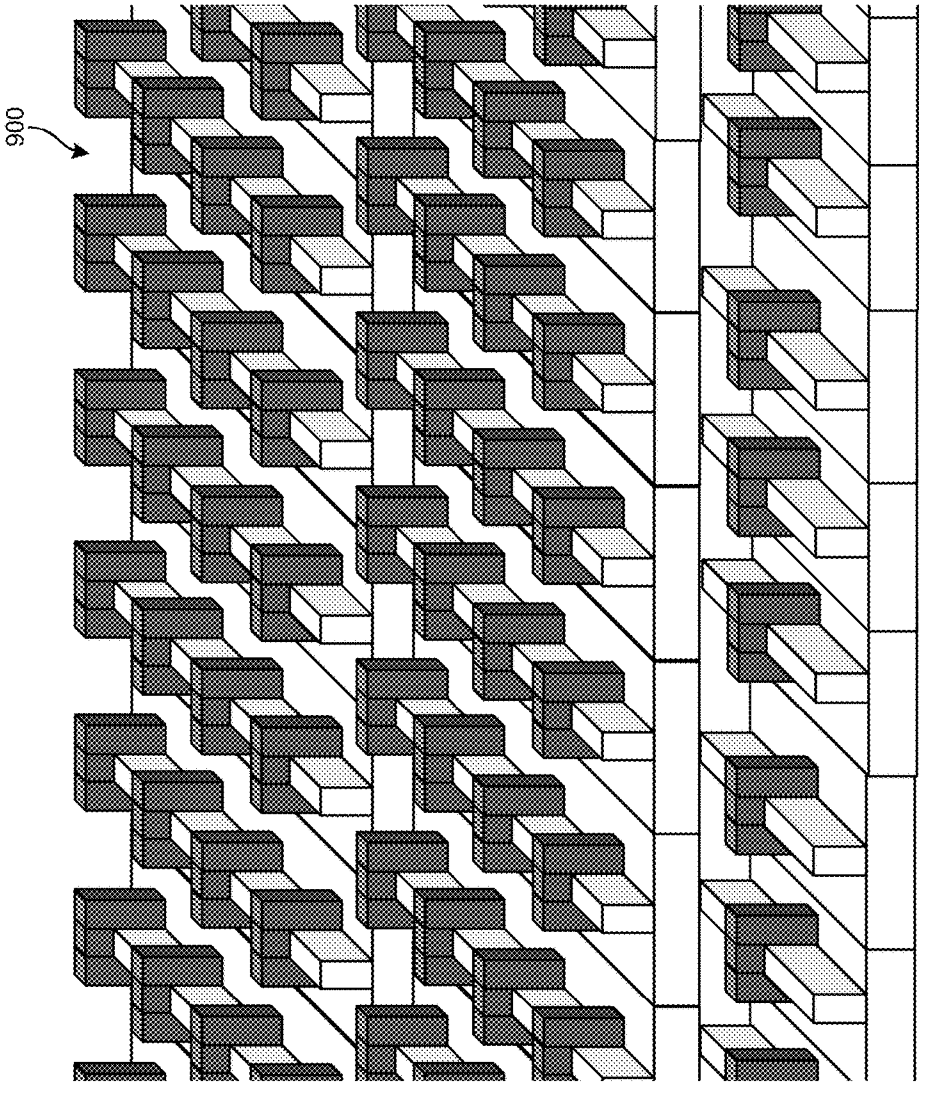
FIG. 9 illustrates a FinFET structure comprising a plurality of fins and a plurality of gates implemented in the same technology node, according to some embodiments.

FIG. 9 illustrates a FinFET structure 900 comprising a plurality of fins and a plurality of gates implemented in the same technology node, according to some embodiments. The term "technology node" may also be referred to as a "process node," a "process technology," or simply a "node." This term may refer to a specific semiconductor manufacturing process with specific design rules, circuit generations, and architectures. The FinFET structure 900 may include fins that are fabricated in rows, with one or more gate structures overlaid on each of the fins. The example of FIG. 9 includes fins with four gates on each fin. However, this is illustrated as only one example of a possible arrangement for the FinFET structure 900. Other structures may include varying numbers of gates on each fin, ranging from a single gate to five gates, seven gates, 10 gates, 15 gates, and/or any range therein. For example, some fins may be implemented with only a single gate, while other fins may be implemented with three gates, five gates, and so forth, such that varying gate configurations are available in the same technology node.

One of the advantages of using ferroelectric FinFET structures is that artificial synapses and artificial neurons can be implement in the same cutting-edge technology node which can follow the scaling of the logic. As described above, the size of an artificial neuron is relatively small compared to the relatively large size of an artificial synapse. Recall that the artificial synapse may require a plurality of physical domains, corresponding to a larger physical size of the gate/channel regions of the device. When using technologies besides FinFET devices, artificial neurons and artificial synapses had to be implemented on different technology nodes because of their varying sizes. However, the multi-gate FinFET technology described herein allows both artificial neurons and artificial synapses to be implemented on the same technology node. Some embodiments may also use technologies including FDSOI or standard bulk-high-K metal technology.

The FinFET structure 900 may be fabricated first by depositing a layer of SOI on top of the silicon substrate. Next, linear rows of a sacrificial layer (e.g., SiGe) can be deposited on top of the SOI to gaps between where pairs of fins should be located. A mask layer ($SiO_2$ or $Si_3N_4$) may be deposited on top of the sacrificial layer and the SOI, and the mask layer can be etched back to form spacers along the edges of the sacrificial layer. Finally, the sacrificial layer can be removed and the SOI can be etched away such that only the portion under the mask layer remains. This portion may form pairs of fins that sit on top of the silicon substrate. Next, various materials described above including a conductive layer and a ferroelectric layer may be deposited in patterns on top of the fins to form a plurality of unconnected and/or connected gates.

The FinFET structure 900 illustrated in FIG. 9 represents a bank of raw ferroelectric FinFET transistors that can be configured as a network of neurons and synapses depending on how the gates are connected together. The fabrication of this bank of FinFETs is cost-effective during fabrication because the entire structure can be built using the same technology node. This structure can also be combined with other CMOS circuits and scaled to be as large or as small as needed for each particular application.

Connecting multiple gates together may form artificial synapses, while using single gates on a fin may form artificial neurons. Synapses may be multi-channel (multiple gates on multiple fins) and/or multi-gate (multiple gates on a single fin). Some embodiments may connect the various gates together to form the network of neurons and synapses by direct gate deposition. For example, the same process that deposits the conductive material for the gates on the fins in the FinFET structure 900 may also be used to deposit conductive traces that connect the various gates together to form artificial synapses. Direct gate deposition can also be used to connect artificial synapses and artificial neurons together into a neural network.

Figure 10:
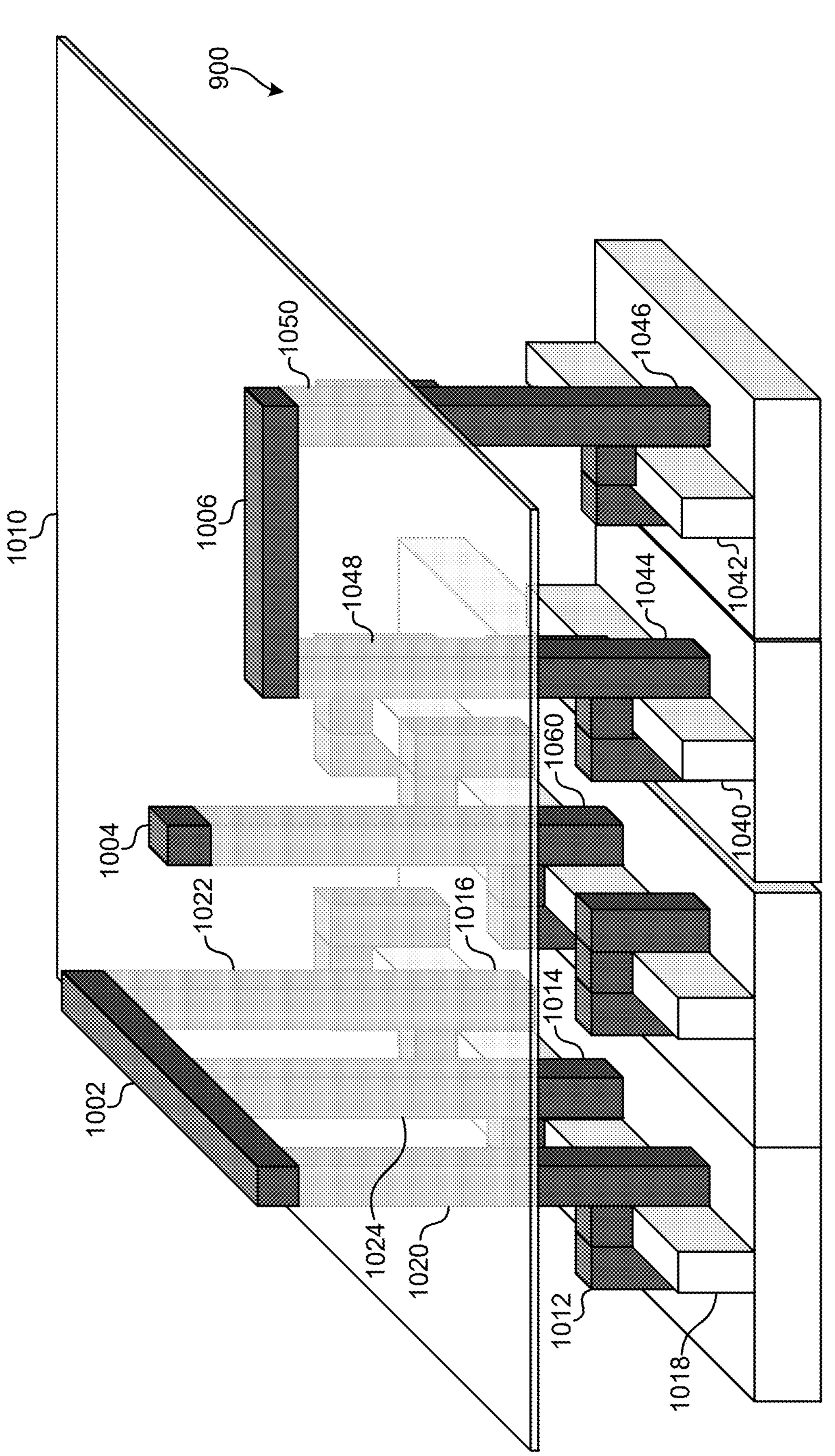
FIG. 10 illustrates how connections can be made between gates in the FinFET structure 900 above the gate deposition layer, according to some embodiments.

FIG. 10 illustrates how connections can be made between gates in the FinFET structure 900 above the gate deposition layer, according to some embodiments. Some embodiments may add connections between gates to form the synapses and the neural network in a BEoL process, such as a metal layer. In the example of FIG. 10, a metal layer 1010 may be used to route connections between various gates. For example, a connection 1002 in the metal layer 1010 may be used to connect three gates 1012, 1014, 1016 together on a single fin 1018 to form a synapse. The gates 1012, 1014, 1016 may be connected to the metal layer 1010 through a plurality of VIAs 1020, 1022, 1024. The synapse formed by the three connected gates 1012, 1014, 1016 may represent a multi-gate, single-fin artificial synapse as described above.

The same process may also be used to form a multi-channel synapse using a plurality of fins. For example, multiple gates 1044, 1046 on separate fins 1040, 1042 may be connected together using a connection 1006 in the metal layer 1010 and a pair of VIAs 1048, 1050. This may form a multi-channel synapse, which may be preferable in certain embodiments. Additionally, neurons can be formed by connecting a single gate 1060 to a connection 1004 in the metal layer 1010. Although not shown explicitly in FIG. 10, additional connections may be made in the metal layer 1010 between the artificial synapses and the artificial neurons. Additionally, connections may be made to the source/drain regions of the FinFETs through VIAs to the metal layer 1010 to complete the neural network.

In some embodiments, the connections illustrated in the metal layer 1010 can instead be made in a system-level layer such that the FinFET structure 900 can be configured and/or reconfigured after the manufacturing process is complete. For example, each of the gates on the FinFET structure 900 in FIG. 9 and FIG. 10 may have a VIA connection to a system-level layer. In some embodiments, the system-level layer may include a configurable network of connections, such as the configurable networks found in field-programmable gate arrays (FPGAs) or other configurable logic devices. This option allows the neural network to be configured and reconfigured multiple times by controlling the connections in the system-level layer. Some embodiments may also connect the VIAs that are coupled to each of the gates to inputs for a programmable processor, such as a microcontroller or microprocessor. These embodiments allow the connections in the neural network to be configured and reconfigured at runtime.

Figure 11:
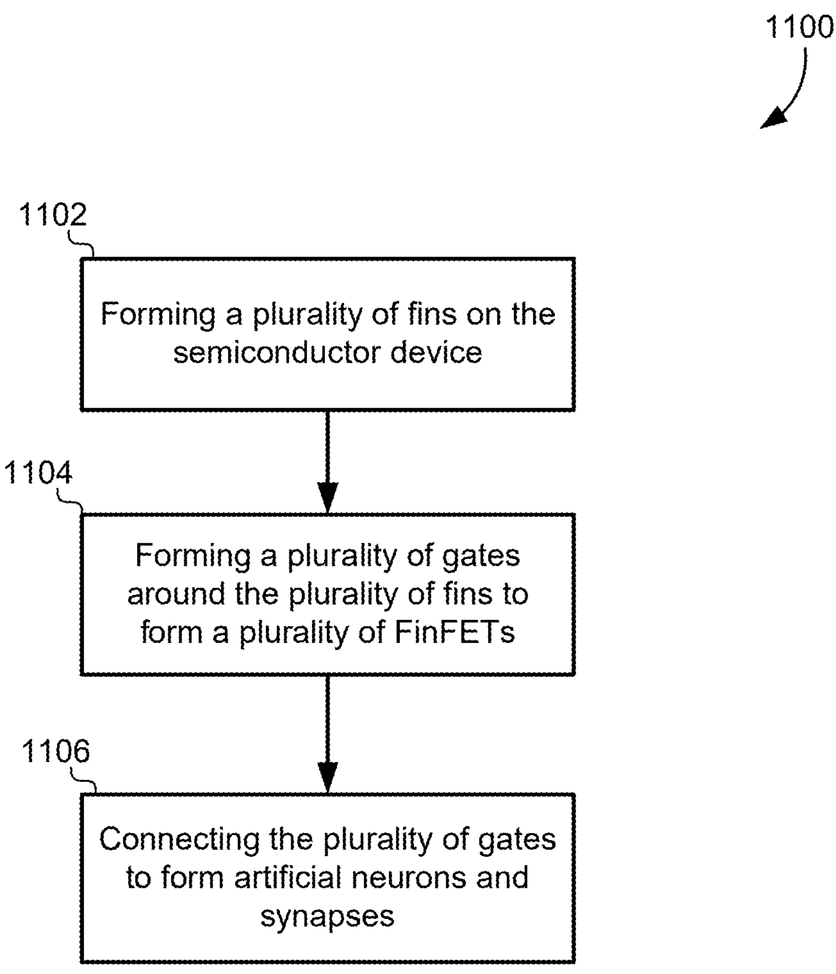
FIG. 11 illustrates a flowchart of a method for implementing a network of artificial neurons and synapses together on a semiconductor device, according to some embodiments.

FIG. 11 illustrates a flowchart 1100 of a method for implementing a network of artificial neurons and synapses together on a semiconductor device, according to some embodiments. The method may include forming a plurality of fins on the semiconductor device (1102). The fins may be formed using the process described above. The fin(s) may be formed on a single silicon substrate in a single technology node. Some embodiments may form the fins such that they have a uniform width and/or a uniform spacing. The semiconductor device may include a silicon substrate where each of the plurality of fins is formed as a vertical ridge on the silicon substrate as illustrated above. The fins may be any width, such as 10 nm wide.

The method may also include forming a plurality of gates around the plurality of fins to form a plurality of FinFET devices (1104). The FinFET devices may also include a layer of ferroelectric material to form ferroelectric FinFETs. As illustrated in FIG. 10, the plurality of gates may be formed such that multiple gates are formed on a single fin, and such that single gates are formed on single fins.

The method may also include connecting gates together in the plurality of gates to form artificial neurons and/or artificial synapses (1106). For example, an artificial synapse may be formed by connecting together a plurality of gates on a single fin. An artificial synapse may also be formed by connecting a plurality of gates on a plurality of fins together. Connections between artificial synapses and artificial neurons and connections to form the artificial synapses may be formed in a gate deposition layer, a metal layer, or a system-level layer as described above. These connections may also include connections between neurons and synapses to form a neural network. When the neural network is formed, the artificial neurons may be configured to receive a plurality of signal pulses before switching between conductive states as described above. Similarly, the artificial synapses may be configured to receive a plurality of signal pulses that successively cause individual domains within the synapses to switch between conductive states.

It should be appreciated that the specific steps illustrated in FIG. 11 provide particular methods of implementing artificial neurons and artificial synapses according to various embodiments. Other sequences of steps may also be performed according to alternative embodiments. For example, alternative embodiments may perform the steps outlined above in a different order. Moreover, the individual steps illustrated in FIG. 11 may include multiple sub-steps that may be performed in various sequences as appropriate to the individual step. Furthermore, additional steps may be added or removed depending on the particular applications. One of ordinary skill in the art would recognize many variations, modifications, and alternatives.

In the foregoing description, for the purposes of explanation, numerous specific details were set forth in order to provide a thorough understanding of various embodiments. It will be apparent, however, to one skilled in the art that embodiments may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the example embodiments will provide those skilled in the art with an enabling description for implementing an example embodiment. It should be understood that various changes may be made in the function and arrangement of elements without departing from the spirit and scope of various embodiments as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

In the foregoing specification, aspects various embodiments are described with reference to specific embodiments, but those skilled in the art will recognize that the invention is not limited thereto. Various features and aspects of the above-described embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A semiconductor device that implements artificial neurons and synapses together on the semiconductor device, the semiconductor device comprising:

a plurality of fins formed on the semiconductor device;

a plurality of gates formed around the plurality of fins to form a plurality of fin field-effect transistors (FinFETs), wherein:

the plurality of FinFETs comprise one or more artificial synapses and one or more artificial neurons;

each of the one or more artificial synapses comprises two or more of the plurality of gates that are conductively connected together; and each of the one or more artificial neurons comprises one of the plurality of gates.

2. The semiconductor device of claim 1, further comprising:

one or more connections between the plurality of gates, wherein the one or more connections form a network of the one or more artificial synapses and the one or more artificial neurons.

3. The semiconductor device of claim 2, wherein the one or more connections between the plurality of gates are implemented directly after gate deposition.

4. The semiconductor device of claim 2, wherein the one or more connections between the plurality of gates are implemented in a metal layer of the semiconductor device.

5. The semiconductor device of claim 1, wherein:

the plurality of fins comprises a first fin;

the plurality of gates comprises a first plurality of gates; and the first plurality of gates is formed over the first fin to form a single one of the one or more artificial synapses.

6. The semiconductor device of claim 1, wherein:

the plurality of fins comprises a first plurality of fins;

the plurality of gates comprises a first gate; and the first gate is formed over the first plurality of fins to form at least a portion of one of the one or more artificial synapses.

7. The semiconductor device of claim 1, wherein the semiconductor device comprises a silicon substrate, and each of the plurality of fins is formed as a vertical ridge in the silicon substrate.

8. The semiconductor device of claim 1, wherein the plurality of finFETs comprises a plurality of ferroelectric finFETs, wherein the two or more of the plurality of gates form two or more ferroelectric domains that switch independently in response to pulses received by a corresponding artificial synapse.

9. The semiconductor device of claim 1, wherein the plurality of fins is formed in a uniform pattern on the semiconductor device, such that each of the plurality of fins can be used for one of the one or more artificial neurons or one of the one or more artificial synapses.

10. The semiconductor device of claim 1, wherein each of the plurality of fins is formed to have a uniform width.

11. A method of implementing artificial neurons and synapses together on a semiconductor device, the method comprising:

forming a plurality of fins on the semiconductor device;

forming a plurality of gates around the plurality of fins to form a plurality of fin field-effect transistors (FinFETs), wherein:

the plurality of FinFETs comprise one or more artificial synapses and one or more artificial neurons;

each of the one or more artificial synapses comprises two or more of the plurality of gates that are conductively connected together; and each of the one or more artificial neurons comprises one of the plurality of gates.

12. The method of claim 11, further comprising making one or more connections between the plurality of gates, wherein the one or more connections form a network of the one or more artificial synapses and the one or more artificial neurons.

13. The method of claim 12, wherein the one or more connections are made in a system level after fabricating the semiconductor device.

14. The method of claim 12, wherein the one or more connections are made in a software level after fabricating the semiconductor device.

15. The method of claim 11, wherein each of the one or more artificial neurons is configured to receive a plurality of signal pulses before switching between conductivity states.

16. The method of claim 11, wherein each of the one or more artificial synapses is configured to receive a plurality of signal pulses, each of which cause respective domains to switch between conductivity states.

17. The method of claim 11, wherein each of the plurality of fins is 10 nm wide.

18. The method of claim 11, wherein the plurality of fins and the plurality of gates are formed in a plurality of discrete fields as neurons, and ones of the plurality of discrete fields are connected to form synapses.

19. The method of claim 11, wherein the plurality of fins and the plurality of gates are formed in a same technology node.

20. The method of claim 11, further comprising forming one or more complimentary metal-oxide silicon (CMOS) circuits on the semiconductor device.

* * * * *